Feb. 21, 1956    LE CONIE STILES    2,735,379
ART OF SHEETING DOUGH

Filed May 22, 1951    3 Sheets-Sheet 1

INVENTOR.
Le Conie Stiles

Feb. 21, 1956  LE CONIE STILES  2,735,379
ART OF SHEETING DOUGH

Filed May 22, 1951  3 Sheets-Sheet 2

INVENTOR.
Le Conie Stiles

Feb. 21, 1956 LE CONIE STILES 2,735,379
ART OF SHEETING DOUGH
Filed May 22, 1951 3 Sheets-Sheet 3
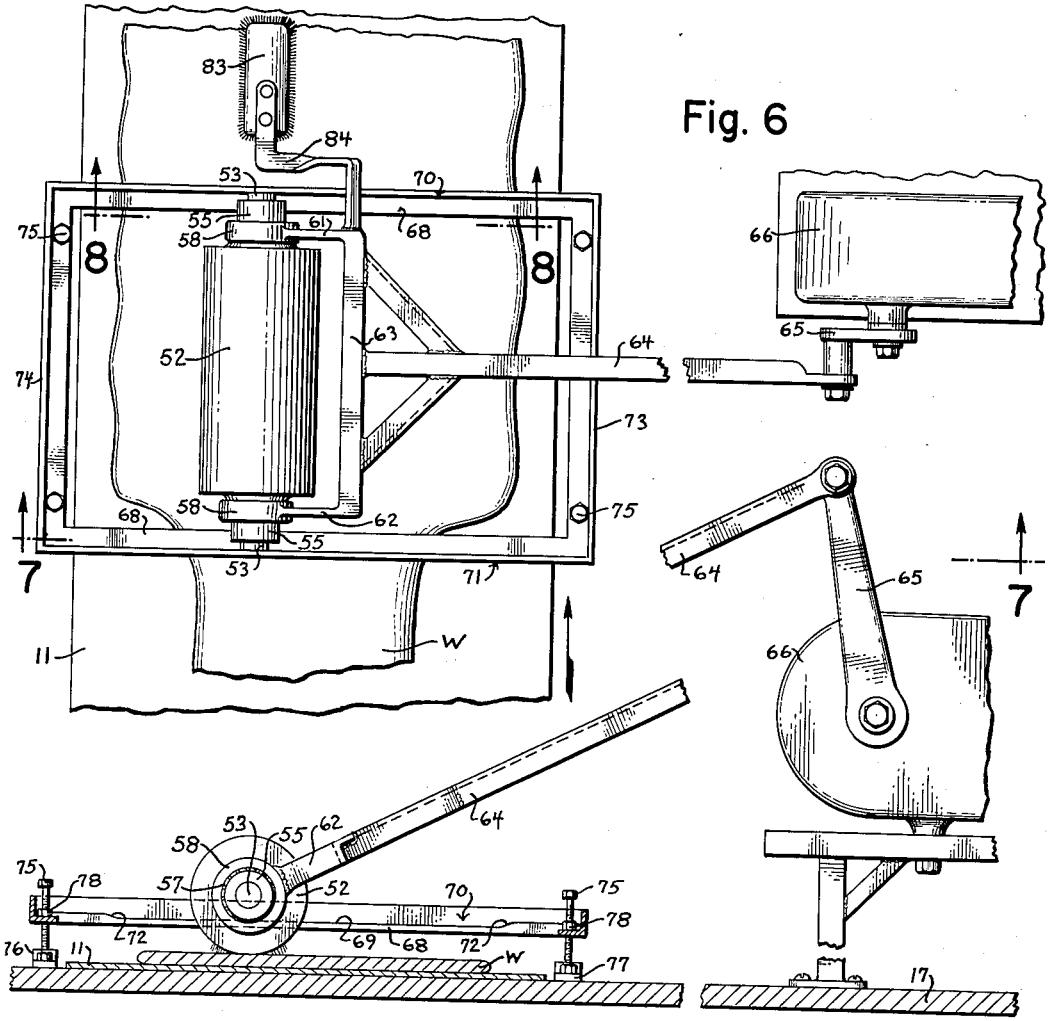
Fig. 6
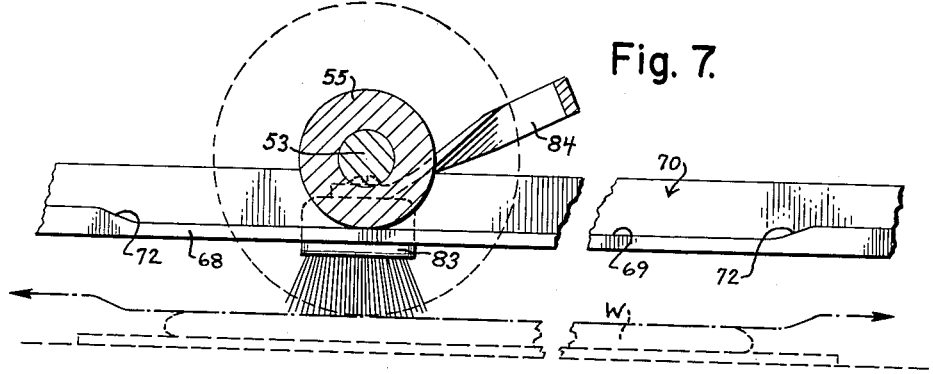
Fig. 7.
Fig. 8
INVENTOR.
Le Conie Stiles

United States Patent Office 2,735,379
Patented Feb. 21, 1956

2,735,379
ART OF SHEETING DOUGH

Le Conie Stiles, Seattle, Wash.

Application May 22, 1951, Serial No. 227,549

6 Claims. (Cl. 107—12)

This invention relates to the art of sheeting dough, and its principal object is to provide a method and apparatus whereby a conveyed elongated body of dough which preferably has been subjected to an initial sheeting operation, such as that disclosed in my prior United States Patent #2,289,388, can be further sheeted to a desired lesser thickness without interrupting the travel of the dough. More particularly, the invention aims to provide a sheeting system which enables an advancing length of dough to be sheeted to desired thickness by an overhead pressure agent, preferably a reciprocating roller, while being carried on a conveyor belt.

In accomplishing the foregoing, I find that an appreciable amount of dry flour must be applied to the conveyor belt beneath the advancing dough in order to preclude the dough from sticking to the underlying belt. Accordingly, it is an important object of my invention to provide a device functioning to effectively perform this flouring office. At the same time that this flour is applied the invention further aims to accomplish a relaxing of the dough sufficient to reduce internal stresses obtaining therein as a result of previous working of the dough.

Other objects and advantages of the invention will, with the foregoing, appear and be understood in the course of the following description and claims, the invention consisting in the new method of flouring, relaxing, and sheeting a conveyed dough body and in the novel construction, adaptation and combination of parts hereinafter described and claimed.

Figure 1:
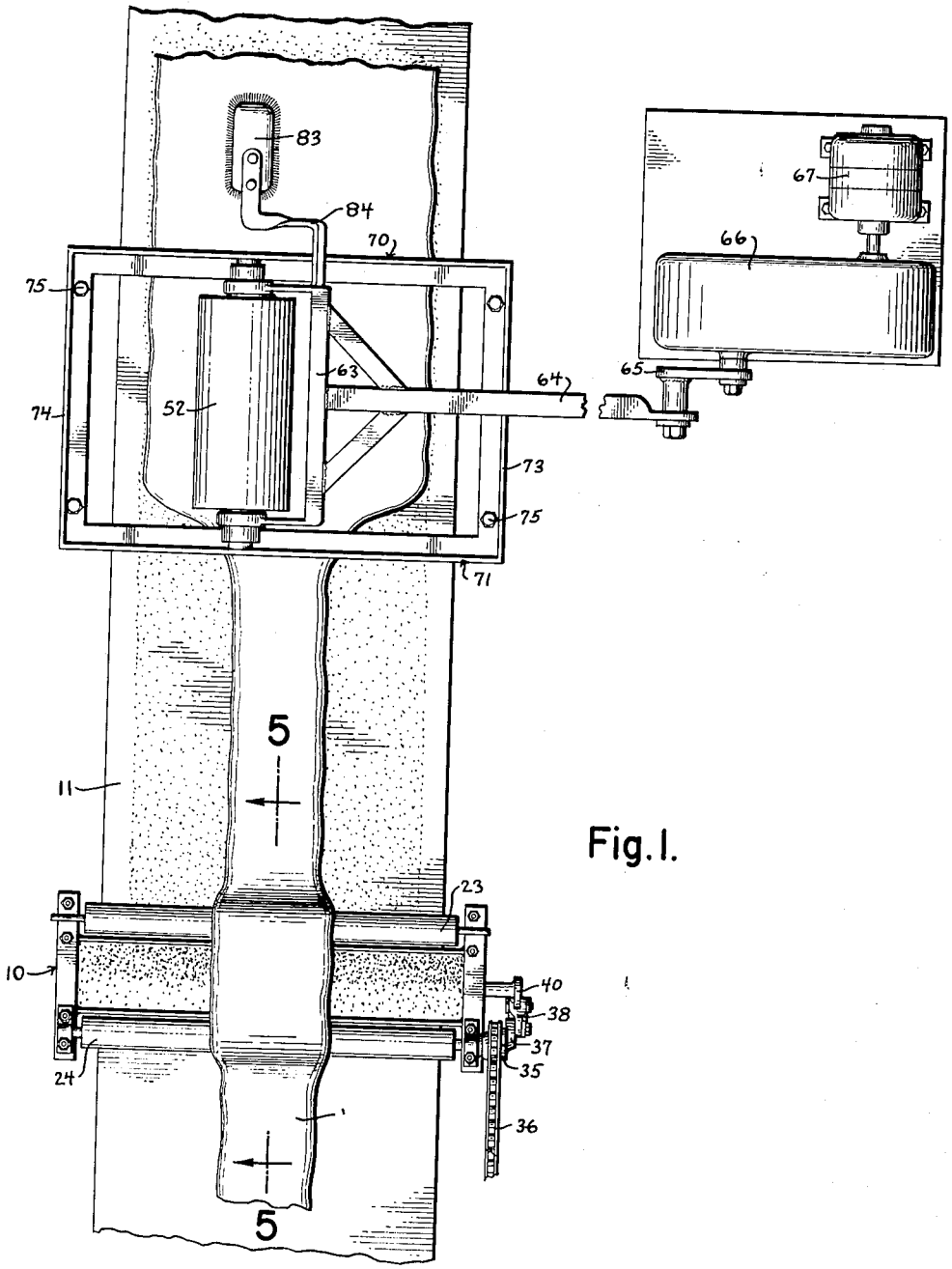
Fig. 1 is a top plan view showing my now preferred embodiment of the invention in operation.
Figure 2:
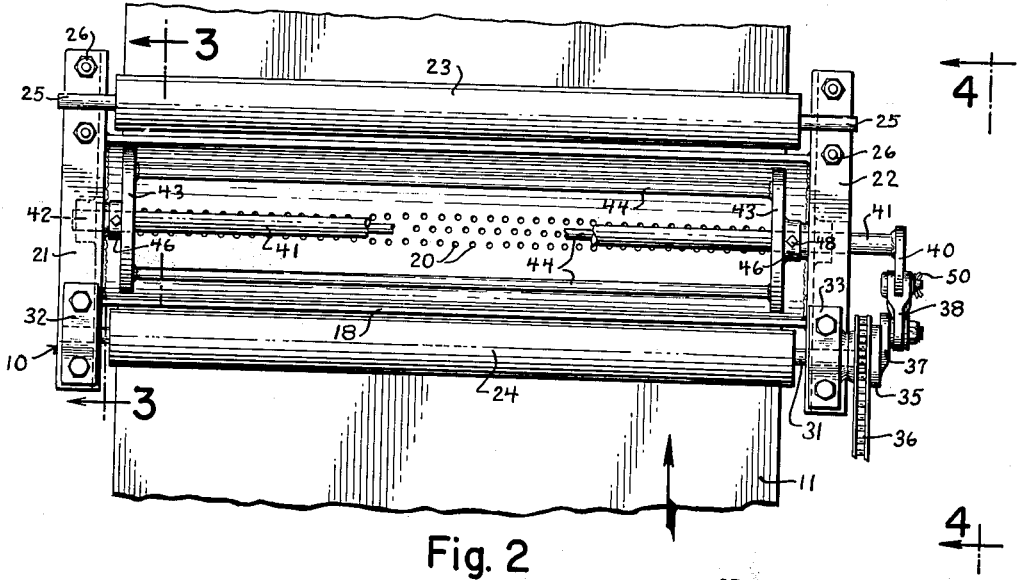
Fig. 2 is an enlarged top plan view of the flour applicator.
Figure 3:
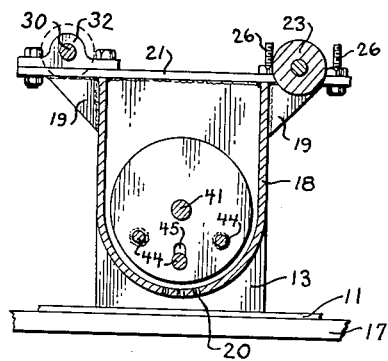
Fig. 3 is a transverse vertical sectional view taken along the line 3—3 of Fig. 2.
Figure 4:
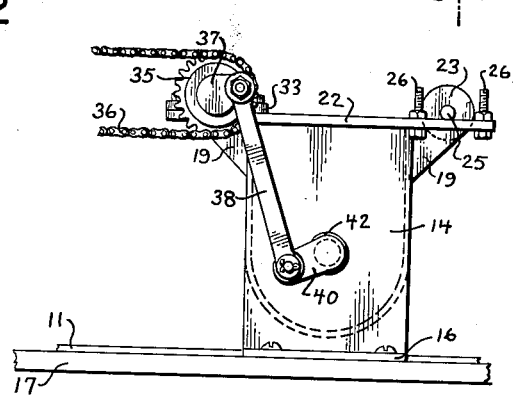
Fig. 4 is an end elevational view taken in the direction noted by the line 4—4 of Fig. 2.
Figure 5:
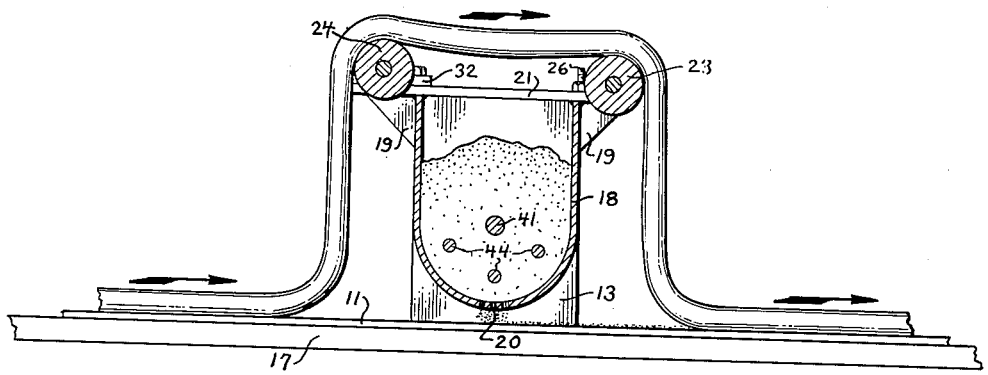
Fig. 5 is a transverse vertical sectional view taken along the line 5—5 of Fig. 1.

Fig. 6 is an enlarged top plan view of the dough spreader and brush attachment; and Figs. 7 and 8 are vertical sectional views taken along the lines 7—7 and 8—8, respectively, of Fig. 6.

To promote a ready understanding of the invention the apparatus illustrated in the drawings will be arbitrarily divided into two parts, with these parts being designated as a flour applicator and a dough spreader.

The flour applicator, designated generally by the numeral 10, is supported in straddling relation to the conveyor belt 11 by a pair of upright transversely spaced end plates 13 and 14 which at their footing ends present anchoring flanges 16, the latter being boltably secured to the underlying work table 17. Extending between and welded at its ends to these end plates is an elongated U-shaped member 18 which together with the plates forms an open-top flour bin. The curved bottom wall of the bin is elevated above the conveyor belt and is perforated to provide several rows of flour-sifting holes 20. At their upper limit the end plates each present an outwardly extending flange, as 21 and 22, which project laterally beyond the sides of the bin. These lateral extensions are braced by gussets 19 and sustain a pair of rollers 23 and 24 positioned at opposite sides of the flour bin. The roller 23 is free-turning and has projecting stub shafts 25 resting on the top face of the support flanges 21 and 22. These stub shafts are not firmly journaled but are free to shift in a direction transverse to the axis thereof between pairs of upwardly extending bolts 26 rigidly secured to the support flanges.

The roller 24, on the other hand, is power driven and has supporting stub shafts 30 and 31 journaled in pillow blocks 32 and 33 which seat upon and are boltably secured to the flanges 21 and 22, respectively. The stub shaft 31 extends beyond the block 33, and secured to the free end thereof is the hub of a sprocket 35 which is driven by chain 36, the source of power for the chain not being shown. On the outer face of the sprocket a crank 37 is provided, which crank is operatively associated by means of a connecting rod 38 with the crank 40 of a flour agitator.

The agitator is driven by a supporting shaft 41 which carries the crank 40. This shaft extends through the end plates 13 and 14 and is journaled in bearings 42 secured to the outside of the plates. The agitator proper comprises a pair of spaced header discs 43 joined by several circumferentially spaced agitating rods, three being shown, extending substantially the entire length of the bin. Viewed from the end, the three rods, each denoted by 44, are located to occupy positions approximating the numerals "3", "6" and "9" of a clock face. The two outer said rods are immovably secured to the headers whereas the centrally placed rod is mounted for floating movement within radial slots 45 cut in the headers. Said headers are centrally bored and present hubs 46 on their outer faces through which the shaft 41 is received. Setscrews 48 lock the headers to the shaft. If it is desired to remove the agitator it is only necessary to remove the cotter pin 50 so as to disconnect the crank 40 from the connecting rod 38 and then back off the set-screws 48, whereupon the shaft can be withdrawn, allowing the agitator to be freely lifted from the bin. It will be noted that the geometry of the cranks 37 and 40 is such that the latter never completes a revolution and hence gives to the agitator merely a rocking action.

Proceeding now to a description of the dough spreader, the spreading action is accomplished by a fairly heavy reciprocating roller 52 presenting a stub shaft 53 at each of its two ends. Fitted upon these stub shafts are bearing sleeves 55, which sleeves each carry a roller bearing 57 adjacent its inner end. The races 58 for these bearings are secured, as by welding, to the arms 61 and 62 of a yoke 63 carried at the outer end of a pitman arm 64. This arm is driven by a crank 65 powered from a motor 67 through suitable reduction gears which are housed in gear box 66. The outer ends of the sleeves 55 ride on inturned webs 68 of angle-iron guide rails 70 and 71 elevated above the conveyor belt and extending transversely thereto. These rails are the longitudinal components of a rectangular frame the end bars 73 and 74 of which are tapped to received elevation-adjusting cap screws 75. The lower ends of the latter threadably engage footings 76 and 77 which are bolted to the work table at opposite sides of the conveyor belt. Locknuts 78 are utilized to set the cap screws 75 after same have been adjusted to the desired height. The webs 68 throughout the greater part of their length present a central tracking surface 69 occupying a level lower than the end portions the junctures being effected through short inclined ramps denoted by 72. In respect of this two-level web, the throw of the crank 65 is such that as the latter is rotated and causes the roller to partake of reciprocal travel along the guide rails, the roller will scale the ramps before reaching either of its two end limits of travel. This, whenever the speed of the roller drops to a critically low velocity, as it approaches and reaches such end limit of reciprocal travel, the roller will be raised somewhat from its normal working level so as to be out of contact with the dough body.

A flour-spreading brush 83 is connected to one end of a Z-arm 84 having its other end secured to the yoke 63. The brush should be longitudinally aligned with the roller 52 as shown so as to traverse the same dough surface. It is appreciated that with the drive arrangement illustrated in the drawings the brush will tilt slightly and vary somewhat in elevation due to the pivotal action of the pitman arm. However, such are so negligible when the Z-arm connection to the yoke arm is in close proximity to the roller that as long as the plane of the bristle tips is normally nearly coincident with the low point of the roller an effective brushing action will result.

In operating the present invention, a long length of the dough to be worked, denoted W, is fed onto the conveyor belt. This dough, as before stated, has preferably been preliminarily sheeted by the mechanism of my prior patent to a more or less uniform width and thickness. The leading end of the dough is manually guided over the rollers 23 and 24 and after this has been accomplished the operation is fully automatic.

As the dough travels over the bin, the flour contained in the latter is sifted through the holes and onto the belt. The rocking action of the agitator in the bin prevents packing of flour and hence assures a continuous delivery of flour to the belt.

It is extremely important to note that as the advancing dough traverses the two rollers 23 and 24 it tends first to be slightly stretched and then to bunch somewhat, and accomplishes the advantageous end of "relaxing" the dough, and which is to say that it relieves internal stresses built up in the dough during the initial working thereof. Thus the apparatus which I have designated as the flour applicator actually has a dual role, and namely, (1) a flouring of the surface of the belt below the dough, and (2) a relaxing of the dough to relieve internal stresses.

After the advancing dough has resumed its normal traveling position on the floured surface of the conveyor belt it is subjected to the action of the dough-spreading reciprocating roller 52. The roller has sufficient weight to effectively sheet the relaxed dough by laterally spreading it on the conveyor belt as it passes therebeneath. The thickness of the sheeted dough is perforce controlled by varying the elevation of the roller above the conveyor, and this is accomplished by means of the adjusting screws 75. At each end of its reciprocal travel, the roller scales the ramps 72 and lifts itself free of the underlying dough. Hence, any tendency for the lateral margins of the dough to adhere to the roller as the latter comes to a stop and changes direction is substantially eliminated.

In the above discussion it has been assumed that the exposed upper surface of the dough has been adequately floured either before or during the sheeting operation. It is in this regard that the flour spreading brush 83 is utilized, and namely, to evenly distribute any localized concentrations of dough which may have been forced by the pressure roller into the top surface of the travelling dough body.

It is my intention that no limitations are to be implied, and that the hereto annexed claims be given the broadest interpretation which the employed language fairly permits.

What I claim is:

1. The method of relaxing an elongated body of sheeted dough while the dough moves from one point to another by energy derived from a moving supporting surface, comprising elevating the dough body off of said surface at a localized point through which said surface moves and while so elevated, causing the dough body to progress along a guided overhead path before descending onto said surface at a second localized point through which said surface moves and spaced beyond the first-named point.

2. The method of flouring a moving supporting surface while an elongated body of dough is being transported by said surface, comprising elevating the dough body off of said surface at a localized point through which said surface moves and while so elevated, causing the dough body to progress along a guided overhead path before descending onto said surface at a second localized point through which said surface moves and spaced beyond the first-named point, and continuously applying flour onto the moving surface which is caused to be progressively exposed in the space between said localized points.

3. The method of working an elongated body of dough while the same is being transported along a defined travel path by a moving supporting surface, comprising spreading the dough body by pressing downwardly upon the same as it moves with the moving supporting surface along a given portion of said travel path, and as steps preliminary to said spreading operation momentarily lifting the dough body off and then returning the dough body to the moving supporting surface at two localized points longitudinally spaced apart along the travel path through which said surface moves, and continuously applying flour onto the moving surface which is caused to be progressively exposed in the spaces between said localized points so as to preclude the dough body from sticking to the moving surface as said dough body is spread by force of said downwardly applied pressure.

4. The method by which a sheeted dough body is first relaxed and then re-sheeted progressively from one to the other end limit of the dough sheet while the dough sheet is being transported along a defined travel path by a moving supporting surface, comprising momentarily disassociating the dough sheet from said moving surface at a given stage of the sheet's transported travel and during such disassociation continuously shifting flour onto that portion of the moving surface which is exposed by such disassociation, and at a given later stage of the dough body's transported travel with said moving surface rolling the dough body tranversely upon said floured surface to spread the same laterally.

5. In the dough-sheeting art, and in combination with a driven endless belt serving by its upper run to give conveyed travel to an elongated body of dough, a pressure roller acting upon the dough body in course of its conveyed travel for laterally spreading said dough body, said roller being guided for rolling movement along a horizontal path extending transverse to the path travelled by the conveyed dough body, means for reciprocally moving said roller along said tranverse path, and means for lifting said roller off the dough body as the roller approaches and comes to a stop at each end limit of its guided reciprocal movement.

6. The structure of claim 5, means being provided for momentarily raising the dough body off the belt in course of its conveyed travel to the pressure roller, and means for continuously flouring the surface of the belt which is caused to be exposed by said momentary raising of the dough body.

References Cited in the file of this patent

UNITED STATES PATENTS

| 262,888 | Butler et al. | Aug. 15, 1882 |
|---|---|---|
| 1,700,303 | Bauer | Jan. 29, 1929 |
| 1,741,722 | Kremmling | Dec. 31, 1929 |
| 1,771,506 | Mustin | July 29, 1930 |
| 1,958,808 | Zehender | May 15, 1934 |
| 2,019,818 | Jassoy | Nov. 5, 1935 |
| 2,357,085 | Cohen | Aug. 29, 1944 |
| 2,526,944 | Grainger | Oct. 24, 1950 |
| 2,604,056 | Mahle | July 22, 1952 |
| 2,621,613 | Anetsberger et al. | Dec. 16, 1952 |

FOREIGN PATENTS

| 541,450 | Germany | Jan. 13, 1932 |